US010005937B2

(12) United States Patent
Kandori et al.

(10) Patent No.: US 10,005,937 B2
(45) Date of Patent: Jun. 26, 2018

(54) RESIN COMPOSITION (71) Applicant: DAI NIPPON PRINTING CO., LTD., Tokyo (JP)

(72) Inventors: Masakazu Kandori, Tokyo (JP); Yohei Hashimoto, Tokyo (JP); Hiroshi Kishida, Tokyo (JP); Rikiya Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 1 day.

(21) Appl. No.: 14/899,332

(22) PCT Filed: Jun. 24, 2014

(86) PCT No.: PCT/JP2014/066616
§ 371 (c)(1),
(2) Date: Dec. 17, 2015

(87) PCT Pub. No.: WO2014/208518
PCT Pub. Date: Dec. 31, 2014

(65) Prior Publication Data
US 2016/0145477 A1   May 26, 2016

(30) Foreign Application Priority Data

Jun. 24, 2013   (JP) .................. 2013-131369

(51) Int. Cl.
*C09J 175/16*   (2006.01)
*C08L 63/00*   (2006.01)
(Continued)

(52) U.S. Cl.
CPC .......... *C09J 175/16* (2013.01); *C08G 18/672* (2013.01); *C08G 18/8116* (2013.01); *C08L 63/00* (2013.01); *H01M 2/0287* (2013.01)

(58) Field of Classification Search
CPC ................. C08F 220/32; C08F 220/36; C08F 2220/343; C08F 230/02; C08F 230/08;
(Continued)

(56) References Cited

U.S. PATENT DOCUMENTS 5,527,616 A * 6/1996 Hatano ..................... B32B 7/12
                                                          428/423.1
6,440,519 B1   8/2002 Takase et al.
(Continued)

FOREIGN PATENT DOCUMENTS

CN   1465108 A   12/2003
CN   1531726 A   9/2004
(Continued)

OTHER PUBLICATIONS

Sep. 9, 2014 International Search Report issued in International Patent Application No. PCT/JP2014/066616.
(Continued)

*Primary Examiner* — Thao T Tran
(74) *Attorney, Agent, or Firm* — Oliff PLC (57) ABSTRACT A resin composition capable of securely adhering multiple members in a short time without having to establish a long aging process. The resin composition including: (1) a urethane (meth)acrylate; (2) at least one selected from a group of (meth)acrylates having a phosphate group, (meth)acrylic silane coupling agents, and (meth)acrylates having an isocyanate group; and (3) a (meth)acrylate having an epoxy group.

10 Claims, 1 Drawing Sheet

(51) Int. Cl.
   *C08G 18/67* (2006.01)
   *C08G 18/81* (2006.01)
   *H01M 2/02* (2006.01)

(58) Field of Classification Search
   CPC .... C08F 18/672; C08F 18/8116; C08L 63/00; C09J 175/16; H01M 2/0287; Y10T 428/31605; Y10T 428/31562; Y10T 428/31565
   USPC .......... 428/423.5, 423.7, 425.8; 522/90; 427/508, 515, 516, 532, 372.2, 299, 322
   See application file for complete search history.

(56) References Cited

U.S. PATENT DOCUMENTS

| | | | |
|---|---|---|---|
| 6,444,285 | B1 | 9/2002 | Murakami |
| 7,052,756 | B2 * | 5/2006 | Tokuda ............ C09J 4/00 428/524 |
| 2003/0180609 | A1 | 9/2003 | Yamashita et al. |
| 2003/0211299 | A1 * | 11/2003 | Rajan ............ B41M 5/5209 428/195.1 |
| 2004/0151869 | A1 | 8/2004 | Tokuda et al. |
| 2006/0000545 | A1 * | 1/2006 | Nageli ............ B32B 27/32 156/272.2 |
| 2006/0003122 | A1 * | 1/2006 | Nageli ............ B32B 7/12 428/35.7 |
| 2007/0123613 | A1 * | 5/2007 | Weikard ............ C08G 18/022 524/80 |
| 2008/0152857 | A1 | 6/2008 | Mizutani et al. |
| 2009/0078747 | A1 | 3/2009 | Park et al. |
| 2010/0112362 | A1 | 5/2010 | Craciun et al. |
| 2011/0070448 | A1 * | 3/2011 | Matsumura ............ B29C 53/04 428/412 |
| 2011/0300367 | A1 | 12/2011 | Chien |
| 2012/0135301 | A1 * | 5/2012 | Akita ............ H01M 2/0212 429/185 |
| 2015/0166751 | A1 * | 6/2015 | Fukumoto ............ H01L 31/0481 428/447 |

FOREIGN PATENT DOCUMENTS

| | | |
|---|---|---|
| CN | 101781486 A | 7/2010 |
| JP | S58-204060 A | 11/1983 |
| JP | H06-57232 A | 3/1994 |
| JP | H10-36809 A | 2/1998 |
| JP | H10-46109 A | 2/1998 |
| JP | H10-287718 A | 10/1998 |
| JP | 2002-114949 A | 4/2002 |
| JP | 2006-104446 A | 4/2006 |
| JP | 2009-114352 A | 5/2009 |
| JP | 2012-506929 A | 3/2012 |

OTHER PUBLICATIONS

Oct. 14, 2016 Extended European Search Report issued in Patent Application No. 14817680.3.

\* cited by examiner

RESIN COMPOSITION

TECHNICAL FIELD

The present invention relates to a resin composition capable of firmly bonding a plurality of members together in a short time. The present invention also relates to a packaging material for a cell in which a cured product of the resin composition is used as an adhesive layer.

BACKGROUND ART

Adhesives for bonding together the same kind of materials such as a resin and a resin, or different kinds of members such as a resin and a metal have been heretofore known. For these adhesives, resin compositions are generally used. For example, in a laminated film to be used as a packaging material for a cell, an adhesive composed of a resin composition is used for bonding a base material layer formed of a resin and a metal layer to each other.

For example, in a packaging material for a cell, a polyurethane-based adhesive is often used as an adhesive for bonding a base material layer and a metal layer to each other. However, it takes a long time to cure a polyurethane-based adhesive. Accordingly, in a step of bonding a base material layer and a metal layer to each other, an aging step of performing heating for a long time is provided for improvement of adhesive strength after the base material and the metal material are laminated to each other with an adhesive interposed therebetween.

However, there is the problem that when a long-time aging step is provided, the lead time increases. For solving the problem, for example, Patent Document 1 discloses an adhesive composition for lamination which includes an ionizing radiation reactive group, and a heat and/or humidity-dependent curing reactive group or crosslinking reactive group. Patent Document 2 discloses a method in which an ionizing radiation-curable adhesive composition containing a dimer acid or a dimer acid derivative is used to improve the adhesion of layers in a laminated film.

PRIOR ART DOCUMENTS

Patent Documents

Patent Document 1: Japanese Patent Laid-open Publication No. 6-57232
Patent Document 2: Japanese Patent Laid-open Publication No. 10-36809

SUMMARY OF THE INVENTION

Problems to be Solved by the Invention

The present inventors extensively conducted studies, and resultantly found that when an adhesive composition as disclosed in, for example, Patent Document 1 was used, adhesion between a cured product of the adhesive composition and a resin was satisfactory even when an aging step was not provided, but adhesion between the cured product of the adhesive composition and a metal was not necessarily sufficient. It was also found that when an adhesive composition as disclosed in, for example, Patent Document 2 was used, adhesion between a cured product of the adhesive composition and a metal was not always sufficient.

Further, the present inventors prepared a packaging material for a cell by bonding a base material layer and a metal layer to each other with an adhesive composition, as disclosed in each of Patent Documents 1 and 2, interposed therebetween. The packaging material for a cell was then placed under a moist and hot environment for examining the moisture and heat resistance of the packaging material for a cell, and resultantly it was found that the base material layer and the metal layer peeled from the adhesive layer in some cases, so that it was not always able to maintain the strength of the packaging material for a cell.

The present invention has been devised in view of these problems. An object of the present invention is to provide a resin composition capable of firmly bonding a plurality of members together in a short time without having to provide a long-time aging step. Further, an object of the present invention is to provide a packaging material for a cell in which a base material layer and a metal layer are firmly bonded to each other using the resin composition, the packaging material being excellent in moisture and heat resistance.

Means for Solving the Problems

The present inventors have extensively conducted studies for solving the above-mentioned problems. As a result, it has been found that by using a resin composition including: (1) a urethane(meth)acrylate; (2) at least one selected from the group consisting of a (meth)acrylate having a phosphoric acid group, a (meth)acryl-based silane coupling agent, and a (meth)acrylate having an isocyanate group; and (3) a (meth) acrylate having an epoxy group, a plurality of members can be firmly bonded together without having to provide a long-time aging step. Further, it has been found that by bonding a base material layer and a metal layer to each other using the resin composition, the base material layer and the metal layer are firmly bonded to each other, so that a packaging material for a cell, which is excellent in moisture and heat resistance, is obtained. The present invention has been completed by further conducting studies based on the above-mentioned findings.

That is, the present invention provides a resin composition, the aspects of which are described below; a packaging material for a cell in which a base material layer and a metal layer are bonded to each other using the resin composition; and a method for production thereof.

Item 1. A resin composition including:
 (1) a urethane(meth)acrylate;
 (2) at least one selected from the group consisting of a (meth)acrylate having a phosphoric acid group, a (meth) acryl-based silane coupling agent, and a (meth)acrylate having an isocyanate group; and
 (3) a (meth)acrylate having an epoxy group.

Item 2. The resin composition according to item 1, wherein in the resin composition, the mass ratio of the (1) urethane (meth)acrylate to the total of the (2) at least one selected from the group consisting of a (meth)acrylate having a phosphoric acid group, a (meth)acryl-based silane coupling agent, and a (meth)acrylate having an isocyanate group and the (3) (meth)acrylate having an epoxy group ((1):(2)+(3)) is in the range of 99.8:0.2 to 80:20.

Item 3. The resin composition according to item 1 or 2, which is cured when heated or irradiated with an ionizing radiation.

Item 4. A cured resin composition which is formed by curing the resin composition according to any one of items 1 to 3.

Item 5. A packaging material for a cell which includes a laminate in which at least a base material layer, an adhesive layer, a metal layer and a sealant layer are laminated in this order, wherein the adhesive layer is formed of a cured product of the resin composition according to any one of items 1 to 3.

Item 6. A method for producing a packaging material for a cell, the method including a step of laminating at least a base material layer, an adhesive layer, a metal layer and a sealant layer in this order to obtain a laminate, the step including forming the adhesive layer by curing a resin composition containing: (1) a urethane(meth)acrylate; (2) at least one selected from the group consisting of a (meth)acrylate having a phosphoric acid group, a (meth)acryl-based silane coupling agent, and a (meth)acrylate having an isocyanate group; and (3) a (meth)acrylate having an epoxy group.

Item 7. Use of a cured product of the resin composition according to any one of items 1 to 3 in the adhesive layer of the packaging material for a cell which includes a laminate in which at least a base material layer, an adhesive layer, a metal layer and a sealant layer are laminated in this order.

Item 8. Use of a packaging material for producing a cell, the packaging material including a laminate in which at least a base material layer, an adhesive layer, a metal layer and a sealant layer are laminated in this order, the adhesive layer being formed of a cured product of the resin composition according to any one of items 1 to 3.

Advantages of the Invention

According to the present invention, there can be provided a resin composition capable of firmly bonding a plurality of members together in a short time. According to the present invention, there can be provided a cured resin composition formed by curing the resin composition. Further, according to the present invention, there can be provided a packaging material for a cell in which a base material layer and a metal layer are firmly bonded to each other using the resin composition, the packaging material being excellent in moisture and heat resistance. That is, in the packaging material for a cell according to the present invention, the base material layer and the metal layer are firmly bonded to each other by a cured product of the resin composition of the present invention, so that delamination between the base material layer and the metal layer hardly occurs even when the packaging material for a cell is placed under a moist and hot environment.

EMBODIMENTS OF THE INVENTION

A resin composition of the present invention includes (1) a urethane(meth)acrylate; (2) at least one selected from the group consisting of a (meth)acrylate having a phosphoric acid group, a (meth)acryl-based silane coupling agent, and a (meth)acrylate having an isocyanate group; and (3) a (meth)acrylate having an epoxy group. Hereinafter, the resin composition of the present invention, a packaging material for a cell in which a base material layer and a metal layer are bonded to each other using the resin composition, and a method for production thereof will be described.

1. Resin Composition

The resin composition of the present invention includes (1) a urethane(meth)acrylate; (2) at least one selected from the group consisting of a (meth)acrylate having a phosphoric acid group, a (meth)acryl-based silane coupling agent, and a (meth)acrylate having an isocyanate group; and (3) a (meth)acrylate having an epoxy group. In the present invention, the urethane(meth)acrylate is a generic name for urethane acrylates and urethane methacrylates. Similarly, the name of a compound including (meth), such as a (meth)acrylate, is a generic name for compounds with "meth" included in the name thereof and compounds with no "meth" included in the name thereof.

The urethane(meth)acrylate is not particularly limited as long as it is a compound having at least one (meth)acryloyl group and at least one urethane bond in the molecule. The urethane(meth)acrylate in the present invention is a compound which is obtained by esterifying with a (meth)acrylic acid a polyurethane oligomer obtained by, for example, reaction of a polyhydric alcohol such as a polyether polyol or a polyester polyol with a polyisocyanate.

The number of (meth)acryloyl groups in the molecule of the urethane(meth)acrylate is not particularly limited, but for example, it is preferably 2 or more, more preferably 2 to 6, further preferably 2 to 4 for further increasing the curing rate of the resin composition to more firmly bond the members together. When the number of (meth)acryloyl groups is 1, practicability may be deteriorated because the curing rate of the resin composition is low. When the number of (meth)acryloyl groups is more than 6, the number of crosslinkages increases, so that a cured product of the resin composition (cured resin composition) may be excessively hard, leading to a decrease in bonding strength.

The weight average molecular weight of the urethane (meth)acrylate is not particularly limited, but for example, it is preferably in the range of about 6,000 to 15,000, more preferably in the range of about 8,000 to 13,000 for further increasing the curing rate of the resin composition to more firmly bond the members together, and also further improving the moldability of the bonded members. When the weight average molecular weight of the urethane(meth) acrylate is less than 6,000, a cured product of the resin composition may be excessively hard, leading to a decrease in bonding strength. When the weight average molecular weight of the urethane(meth)acrylate is more than 15,000, a cured product of the resin composition may be excessively soft, leading to a decrease in bonding strength. The weight average molecular weight of the urethane(meth)acrylate is a value obtained by performing measurement by gel permeation chromatography (GPC) using polystyrene as a standard sample.

When the urethane(meth)acrylate has two or more (meth) acryloyl groups, the apparent inter-crosslinking point molecular weight of the urethane(meth)acrylate is not particularly limited, but for example, it is preferably in the range of about 2,000 to 15,000, more preferably in the range of about 3,000 to 15,000. In the present invention, by using a urethane(meth)acrylate having a weight average molecular weight and a (meth)acryloyl group number as described above, the curing rate of the resin composition can be further increased to more firmly bond the members together, and also the moldability of the bonded members can be improved, and further, when the apparent inter-crosslinking point molecular weight of the urethane(meth)acrylate is in the above-mentioned range, these effects can be further improved. When the apparent inter-crosslinking point molecular weight of the urethane(meth)acrylate is less than 2,000, a cured product of the resin composition may be excessively hard, leading to a decrease in bonding strength. When the apparent inter-crosslinking point molecular weight of the urethane(meth)acrylate is more than 15,000, a cured product of the resin composition may be excessively soft, leading to a decrease in bonding strength.

Here, the apparent inter-crosslinking point molecular weight (Y) is a value calculated in accordance with the following equation.

$$Y=(M\div X)\times 2$$

M: number average molecular weight of urethane(meth) acrylate

X: number of (meth)acryloyl groups

The apparent crosslinking point molecular weight in the present invention means the molecular weight of (meth) acryloyl groups in the molecule of the urethane(meth) acrylate. The number average molecular weight of the urethane(meth)acrylate is a value obtained by performing measurement by gel permeation chromatography (GPC) using polystyrene as a standard sample. The apparent inter-crosslinking point molecular weight of the (meth)acrylate can be appropriately selected by taking into consideration the number average molecular weight of the urethane(meth) acrylate and the number of (meth)acryloyls.

The urethane(meth)acrylate can be produced by a known method, or a commercial product can be used. Only one urethane(meth)acrylates may be used, or two or more urethane(meth)acrylates may be used.

The (meth)acrylate having a phosphoric acid group is not particularly limited as long as it is a compound having a phosphoric acid group and a (meth)acryloyl group in the molecule. The (meth)acrylate having a phosphoric acid group has a (meth)acryloyl group in the molecule, and therefore reacts with the (meth)acryloyl group in the urethane(meth)acrylate to serve as a curing agent for curing the resin composition. Examples of the (meth)acrylate having a phosphoric acid group include phosphoric acid esters of (meth)acrylate such as 2-acryloyloxyethyl acid phosphate and 2-acryloyloxybutyl acid phosphate. As the (meth)acrylate having a phosphoric acid group, one produced by a known method can be used, or a commercial product can be used. Only one (meth)acrylates having a phosphoric acid group may be used, or two or more (meth)acrylates having a phosphoric acid group may be used.

The (meth)acryl-based silane coupling agent is not particularly limited as long as it is a silane coupling agent having a (meth)acryloyl group in the molecule. The (meth) acryl-based silane coupling agent has a (meth)acryloyl group in the molecule, and therefore reacts with the (meth) acryloyl group in the urethane(meth)acrylate to serve as a curing agent for curing the resin composition. As the (meth) acryl-based silane coupling agent, for example, a silane coupling agent having an alkoxysilyl group and a (meth) acryloyl group in the molecule, such as 3-acryloxypropyltrimethoxysilane, 3-acryloxypropyltriethoxysilane, 3-methacryloxypropyltrimethoxysilane, 3-methacryloxypropylmethyldimethoxysilane, 3-methacryloxypropyltriethoxysilane or 3-methacryloxypropylethyldiethoxysilane, can be used. As the (meth)acryl-based silane coupling agent, one produced by a known method can be used, or a commercial product can be used. Only one (meth)acryl-based silane coupling agent may be used, or two or more (meth)acryl-based silane coupling agents may be used.

The (meth)acrylate having an isocyanate group is not particularly limited as long as it is a compound having an isocyanate group and a (meth)acryloyl group in the molecule. The (meth)acrylate having an isocyanate group has a (meth)acryloyl group in the molecule, and therefore reacts with the (meth)acryloyl group in the urethane(meth)acrylate to serve as a curing agent for curing the resin composition. In the present invention, as the (meth)acrylate having an isocyanate group, for example, an esterified product of a (meth)acrylic acid and a hydroxyl group-containing isocyanate compound, such as 2-isocyanatoethyl acrylate or 2-(2-methacryloyloxyethyloxy)ethyl isocyanate, can be used. As the (meth)acrylate having an isocyanate group, one produced by a known method can be used, or a commercial product can be used. Only one (meth)acrylates having an isocyanate group may be used, or two or more (meth) acrylates having an isocyanate group may be used.

The (meth)acrylate having an epoxy group is not particularly limited as long as it is a compound having an epoxy group and a (meth)acryloyl group in the molecule. The (meth)acryloyl group having an epoxy group reacts with the (meth)acryloyl group in the urethane(meth)acrylate to serve as a curing agent for curing the resin composition. In the present invention, as the (meth)acrylate having an epoxy group, for example, a compound having an epoxy group and a (meth)acryloyl group, such as bisphenol A type epoxy acrylate or 4-hydroxybutyl acrylate glycidyl ether, can be used. As the (meth)acrylate having an epoxy group, one produced by a known method can be used, or a commercial product can be used. Only one (meth)acrylates having an epoxy group may be used, or two or more (meth)acrylates having an epoxy group may be used.

In the resin composition, the mass ratio of the mass of the (1) urethane(meth)acrylate to the total mass of the (2) at least one selected from the group consisting of a (meth)acrylate having a phosphoric acid group, a (meth)acryl-based silane coupling agent, and a (meth)acrylate having an isocyanate group and the (3) (meth)acrylate having an epoxy group ((1):(2)+(3)) is not particularly limited, but for example, it is preferably in the range of 99.8:0.2 to 80:20, more preferably in the range of 98:2 to 90:10. When the mass ratio is in the above-mentioned range, a plurality of members can be firmly bonded together in a short time. From the same point of view, the mass ratio of the urethane(meth)acrylate to the (meth)acrylate having a phosphoric acid group is preferably in the range of 99.8:0.2 to 80:20, more preferably in the range of 99:1 to 90:10. The mass ratio of the urethane(meth) acrylate to the (meth)acryl-based silane coupling agent is preferably in the range of 99.9:0.1 to 95:5, more preferably in the range of 99.8:0.2 to 98:2. The mass ratio of the urethane(meth)acrylate to the (meth)acrylate having an isocyanate group is preferably in the range of 99.8:0.2 to 80:20, more preferably in the range of 99:1 to 90:10. Further, the weight ratio of the urethane(meth)acrylate to the (meth)

acrylate having an epoxy group is preferably in the range of 99.8:0.2 to 80:20, more preferably in the range of 99:1 to 90:10.

The resin composition of the present invention may further contain other resins for the purpose of, for example, increasing the curing rate, or improving adhesion. As other resins, those that are known can be used, or commercial products can be used. Other resins are not particularly limited, and examples thereof include acrylic resins and epoxy resins. As the acrylic resin, for example, an acrylic resin acrylate or the like can be used. As the epoxy resin, for example, a glycidyl ether type epoxy resin or the like can be used.

When the resin composition contains other resins, the mass ratio of the urethane(meth)acrylate to other resins is not particularly limited, but it is preferably in the range of 99:1 to 70:30, more preferably in the range of 95:5 to 80:20. When the mass ratio is in the above-mentioned range, the curing rate of the resin composition can be increased to more firmly bond a plurality of members together.

The method for curing the resin composition of the present invention is not particularly limited, but for example, heating or ionizing radiation irradiation is preferred, with ionizing radiation irradiation being more preferred. Here, the ionizing radiation means an electromagnetic wave or charged particle ray having an energy quantum capable of polymerizing or crosslinking molecules, and an ultraviolet (UV) ray or an electron beam (EB) is normally used, but an electromagnetic wave such as an X ray or a γ ray, or a charged particle ray such as an α ray or an ion beam may also be used. By using ionizing radiation irradiation, the resin composition can be uniformly cured in a short time without giving a heat history to the resin composition.

Conditions for curing the resin composition can be appropriately determined according to the type of urethane(meth) acrylate or member to be bonded. The heating temperature at which the resin composition is heated to be cured is not particularly limited, and it may be normally about 30° C. to 70° C., preferably about 35° C. to 45° C. The heating time is not particularly limited, and it may be normally about 24 hours to 120 hours, preferably about 48 hours to 72 hours. When the resin composition is to be cured by an ionizing radiation, the ionizing radiation is not particularly limited, and for example, an ultraviolet ray or an electron beam can be used, with the electron beam being preferred. For ionizing radiation irradiation conditions, irradiation may be performed at normally about 25 kGy to 200 kGy, preferably about 30 kGy to 100 kGy.

The resin composition of the present invention can be used as an adhesive for bonding two or more members together. The resin composition of the present invention is cured under the above-mentioned conditions to form a cured resin composition, so that a plurality of members can be firmly bonded together in a short time. The type, shape and the like of the member to be bonded by the resin composition of the present invention is not particularly limited, and can be appropriately selected. Examples of the type of the member to be bonded include a resin and a metal. Examples of the shape of the member to be bonded include a plate shape and a film shape. The thickness of the resin composition of the present invention can also be appropriately determined according to the type, shape and the like of the member to be bonded, but it is normally about 2 μm to 15 μm, preferably about 3 μm to 8 μm.

The resin composition of the present invention can be suitably used particularly as an adhesive for bonding together films of a laminated film. For example, when two films are to be laminated to each other using the resin composition of the present invention, a laminated film can be produced by applying the resin composition to at least one of the films, laminating the other film by a dry lamination method etc., and curing the resin composition by, for example, irradiating the resin composition with an ionizing radiation. The resin composition of the present invention is capable of firmly bonding together not only the same kind of materials such as a resin and a resin but also different kinds of materials such as a resin and a metal, and therefore can be suitably used particularly for bonding together a base material layer and a metal layer of a laminated film. Specific examples of the laminated film for which the resin composition of the present invention can be suitably used include packaging materials for a cell. Hereinafter, the configuration of a packaging material for a cell, which is produced using the resin composition of the present invention, will be described in detail.

2. Packaging Material for Cell

Figure 1:
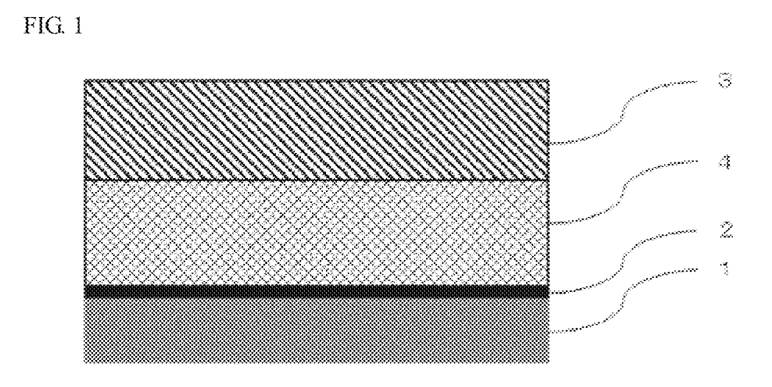
FIG. 1 is a schematic sectional view of one example of a packaging material for a cell according to the present invention.

The packaging material for a cell according to the present invention includes a laminate in which at least a base material layer 1, an adhesive layer 2 formed of a cured product of the resin composition, a metal layer 3 and a sealant layer 4 are laminated in this order as shown in FIG. 1. In the packaging material for a cell, the base material layer 1 is an outermost layer, and the sealant layer 4 is an innermost layer. That is, at the time of assembling a cell, a cell element is covered with the packaging material for a cell in such a manner that the sealant layer 4 of the packaging material for a cell is inside the cell, and sealant layers 4 situated on the peripheral edges of the cell element are heat-sealed to each other to hermetically seal the cell element, so that the cell element is encapsulated.

The packaging material for a cell according to the present invention should include at least a base material layer 1, an adhesive layer 2, a metal layer 3 and a sealant layer 4, and may further include other layers. For example, in the packaging material for a cell according to the present invention, an adhesive layer 5 may be provided between the metal layer 2 and the sealant layer 4 as necessary in order to improve adhesion of these layers as described later. Further, other layers may be formed on the outside of the base material layer 1 for the purpose of, for example, imparting a design property.

3. Compositions of Layers Forming Packaging Material for Cell

[Base Material Layer 1]

In the packaging material for a cell according to the present invention, the base material layer 1 is a layer that forms the outermost layer when a cell is assembled. The material that forms the base material layer 1 is not particularly limited as long as it has insulation quality. Examples of the material that forms the base material layer 1 include polyester resins, polyamide resins, epoxy resins, acrylic resins, fluororesins, polyurethane resins, silicon resins, phenol resins, and resin films of a mixture and a copolymer etc. thereof.

Specific examples of the polyester resin include polyethylene terephthalate, polybutylene terephthalate, polyethylene naphthalate, polybutylene naphthalate, copolymerized polyester and polycarbonate. Specific examples of the polyamide resin include nylon 6, nylon 6,6, copolymers of nylon 6 and nylon 6,6, nylon 6,10 and polymethaxylylene adipamide (MXD6). Among them, nylons and polyesters are preferred, and biaxially stretched nylons and biaxially stretched polyesters are further preferred, with biaxially stretched nylons being especially preferred, as the material that forms the base material layer 1.

The base material layer 1 may be formed of a resin film with one layer, or may be formed of a multilayer resin film with two or more layers. When the base material layer 1 is formed of a multilayer resin film, the pinhole resistance and insulation quality of the packaging material for a cell according to the present invention can be improved. When the base material layer 1 is to be formed from a multilayer resin film, two or more resin films can be laminated to each other with, for example, an adhesive etc. interposed therebetween. The adhesive that is used at this time may be the resin composition of the present invention, or an adhesive for forming an adhesive layer 5 as described later.

The thickness of the base material layer 1 is not particularly limited, and for example, it may be about 10 μm to 50 μm, preferably about 15 μm to 30 μm.

[Metal Layer 3]

In the packaging material for a cell according to the present invention, the metal layer 3 is a layer which is intended to improve the strength of the packaging material, and also functions as a barrier layer for preventing ingress of water vapor, oxygen, light and the like into the cell. The metal that forms the metal layer 3 is not particularly limited, and examples thereof include aluminum, stainless steel and titanium, with aluminum being preferred. The metal layer 3 can be formed from a metal foil or by metal deposition, and is preferably formed from a metal foil, more preferably from an aluminum foil. For preventing occurrence of creases and pinholes in the metal layer 3 during production of the packaging material for a cell, it is especially preferred to form the metal layer 3 from a soft aluminum foil such an annealed aluminum foil (JIS A803P-O) or (JIS A8079P-O).

The thickness of the metal layer 3 is not particularly limited, and for example, it may be about 10 μm to 200 μm, preferably about 20 μm to 100 μm.

Preferably, at least one surface, preferably both surfaces, of the metal layer 3 is subjected to a chemical conversion treatment for stabilization of bonding, prevention of dissolution and corrosion, and so on. Here, the chemical conversion treatment refers to a treatment for forming an acid resistance film on the surface of the metal layer 3. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer having repeating units represented by the following general formulae (1) to (4).

[Chemical Formula 1]

(1)

[Chemical Formula 2]

(2)

[Chemical Formula 3]

(3)

[Chemical Formula 4]

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups having 1 to 4 carbon atoms, such as a methyl group, an ethyl group, an n-propyl group, an isopropyl group, an n-butyl group, an isobutyl group and a tert-butyl group. Examples of the hydroxyalkyl group represented by X, $R^1$ and $R^2$ include linear or branched alkyl groups having 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), an alkyl group or a hydroxyalkyl group each independently represented by X, $R^1$ or $R^2$ may be the same or different. In the general formulae (1) to (4), X is preferably a hydrogen atom, a hydroxyl group or a hydroxyalkyl group. The number average molecular weight of the aminated phenol polymer having repeating units represented by the general formulae (1) to (4) is, for example, preferably about 500 to about 1,000,000, more preferably about 1,000 to about 20,000.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form corrosion resistance treatment layer on the surface of the metal layer 3. A resin layer with a cationic polymer crosslinked with a crosslinking agent may be further formed on the corrosion resistance treatment layer. Here, examples of the cationic polymer include polyethyleneimine, ion polymer complexes formed of a polymer having polyethyleneimine and a carboxylic acid, primary amine-grafted acrylic resins obtained by graft-polymerizing a primary amine with an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

For the chemical conversion treatment, only one chemical conversion treatment may be performed, or two or more chemical conversion treatments may be performed in combination. The chemical conversion treatments may be performed using one compound alone, or may be performed using two or more compounds in combination. Among chemical conversion treatments, a chromic acid chromate treatment, a chromate treatment using a chromic acid compound, a phosphoric acid compound and an aminated phenol polymer in combination, and so on are preferred.

The amount of the acid resistance film to be formed on the surface of the metal layer 3 in the chemical conversion treatment is not particularly limited, but for example, when the above-mentioned chromate treatment is performed, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 mg to about 40 mg, in terms of phosphorus, and the aminated phenol polymer be contained in an amount of about 1 mg to 200 mg, preferably about 5.0 mg to 150 mg, per 1 $m^2$ of the surface of the metal layer 3.

The chemical conversion treatment is performed in the following manner: a solution containing a compound to be used for formation of an acid resistance film is applied to the surface of the metal layer by a bar coating method, a roll coating method, a gravure coating method, an immersion method or the like, and heating is then performed so that the temperature of the metal layer 3 is about 70° C. to 200° C. The metal layer may be subjected to a degreasing treatment by an alkali immersion method, an electrolytic cleaning method, an acid cleaning method, an electrolytic acid cleaning method or the like before the metal layer is subjected to a chemical conversion treatment. When a degreasing treatment is performed as described above, the chemical conversion treatment of the surface of the metal layer can be further efficiently performed.

[Adhesive Layer 2]

In the packaging material for a cell according to the present invention, the adhesive layer 2 is a layer provided between the base material layer 1 and the metal layer 3 for bonding the base material layer 1 and the metal layer 3 to each other.

The adhesive layer 2 can be formed from a cured product of the resin composition of the present invention. The composition of the resin composition and the method for curing the resin composition may be the same as described above.

The thickness of the adhesive layer 2 is not particularly limited, and may be appropriately determined according to the total thickness and strength of an intended packaging material for a cell, and it may be normally about 2 μm to 15 μm, preferably about 3 μm to 8 μm.

In the packaging material for a cell according to the present invention, the adhesive layer 2 is formed of a cured product of the specific resin composition, so that the base material layer 1 and the base material layer 3 are firmly bonded to each other, and excellent moisture and heat resistance is achieved.

[Sealant Layer 4]

In the packaging material for a cell according to the present invention, the sealant layer 4 is a layer that forms the innermost layer of the packaging material for a cell when the cell is assembled. That is, at the time of assembling a cell, a cell element can be hermetically sealed by bringing the surfaces of the sealant layer 4 into contact with each other, and heat-sealing the contact portions.

The resin component for forming the sealant layer 4 is not particularly limited as long as it allows sealant layers 4 to be heat-sealed to each other. Examples the resin component include polyolefins, cyclic polyolefins, carboxylic acid-modified polyolefins and carboxylic acid-modified cyclic polyolefins.

Specific examples of the polyolefin include polyethylenes such as low-density polyethylene, medium-density polyethylene, high-density polyethylene and linear low-density polyethylene; crystalline or noncrystalline polypropylenes such as homopolypropylene, block copolymers of polypropylenes (e.g. block copolymers of propylene and ethylene) and random copolymers of polypropylenes (e.g. random copolymers of propylene and ethylene); terpolymers of ethylene-butene-propylene; and the like. Among these polyolefins, polyethylenes and polypropylenes are preferred.

The cyclic polyolefin is a copolymer of an olefin and a cyclic monomer. Examples of the olefin include ethylene, propylene, 4-methyl-1-pentene, styrene, butadiene and isoprene. Examples of the cyclic monomer include cyclic alkenes such as norbornene; and cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer obtained by modifying the polyolefin with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid may be the same as the above-mentioned cyclic polyolefin. The carboxylic acid to be used for modification may be the same as that used for modification of the acid-modified cycloolefin copolymer.

Among these resin components, crystalline or noncrystalline polyolefins, cyclic polyolefins, and blend polymers thereof are preferred, and polyethylenes, polypropylenes, copolymers of ethylene and norbornene, and blend polymers of two or more thereof are further preferred.

The sealant layer 4 may be formed from only one resin component, or may be formed from a blend polymer obtained by combining two or more resin components. Further, the sealant layer 4 may be formed of only one layer, or may be formed of two or more layers from the same resin component or different resin components.

The thickness of the sealant layer 4 is not particularly limited, and for example, it may be about 2 µm to 2000 µm, preferably about 5 µm to 1000 µm, further preferably 10 µm to 500 µm.

[Adhesive Layer 5]

Figure 2:
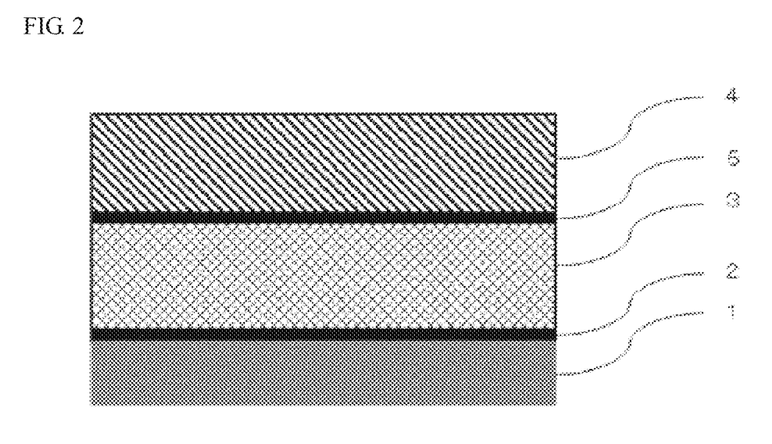
FIG. 2 is a schematic sectional view of one example of a packaging material for a cell according to the present invention.

In the packaging material for a cell according to the present invention, an adhesive layer 5 may be further provided between the metal layer 3 and the sealant layer 4 as shown in FIG. 2 for the purpose of, for example, firmly bonding the metal layer 3 and the sealant layer 4.

The adhesive layer 5 is formed from an adhesive component capable of bonding the metal layer 3 and the sealant layer 4. The adhesive to be used for formation of the adhesive layer 5 is not particularly limited, and may be the resin composition of the present invention, or may be other adhesive, but it is preferred to use the resin composition of the present invention for firmly bonding the metal layer 3 and the sealant layer 4 to each other in a short time. When other adhesive is used, the adhesive may be a two-liquid curable adhesive, or may be a one-liquid curable adhesive. Further, the bonding mechanism of the adhesive used for forming the adhesive layer 5 is not particularly limited, and examples thereof include bonding mechanisms of chemical reaction type, solvent volatilization type, heat melting type and heat pressing type.

Specific examples of the adhesive component of other adhesive that can be used for forming the adhesive layer 5 include polyester-based resins such as polyethylene terephthalate, polybutylene terephthalate, polyethylene naphthalate, polybutylene naphthalate, polyethylene isophthalate, polycarbonate and copolymerized polyester; polyether-based adhesives; polyurethane-based adhesives; epoxy-based resins; phenol resin-based resins; polyamide-based resins such as nylon 6, nylon 66, nylon 12 and copolymerized polyamide; polyolefin-based resins such as polyolefins, carboxylic acid-modified polyolefins and metal-modified polyolefins, polyvinyl acetate-based resins; cellulose-based adhesives; (meth)acryl-based resins; polyimide-based resins; amino resins such as urea resins and melamine resins; rubbers such as chloroprene rubber, nitrile rubber and styrene-butadiene rubber; and silicone-based resins. These adhesive components may be used alone, or may be used in combination of two or more thereof.

The thickness of the adhesive layer 5 is not particularly limited, but for example, it is preferably about 1 µm to 40 µm, more preferably about 2 µm to 30 µm.

4. Method for Packaging Material for Cell

While the method for producing a packaging material for a cell according to the present invention is not particularly limited as long as a laminate including layers each having a predetermined composition is obtained, and for example, the following method may be shown as an example.

At least the base material layer 1, the adhesive layer 2, the metal layer 3 and the sealant layer 4 are laminated in this order to obtain a laminate. Specifically, a solvent containing the resin composition is first applied to at least one of the base material layer 1 and the metal layer 3. For the application of the solvent, a coating method such as an extrusion method, a gravure coating method or a roll coating method can be employed. Next, the solvent is evaporated. Next, the base material layer 1 and the metal layer 3 may be bonded and laminated to each other. Lamination of the base material layer 1 and the metal layer 3 with the resin composition interposed therebetween can be performed by, for example, a dry lamination method. Next, the resin composition situated between the base material layer 1 and the metal layer 3 is irradiated with an ionizing radiation or heated to cure the resin composition, thereby forming the adhesive layer 2. For example, when the base material layer 1 is transparent, it is preferred that an ionizing radiation is applied from the base material layer 1 side to cure the resin composition. The ionizing radiation irradiation can be performed by using, for example, an ultraviolet ray irradiation apparatus, an electron beam irradiation apparatus or the like. For ionizing radiation irradiation conditions, irradiation may be performed at normally about 25 kGy to 200 kGy, preferably about 30 kGy to 100 kGy. Heating can be performed by, for example, a method of hot roll contact type, hot air type, near- or far-infrared type, or the like. The heating temperature may be normally about 30° C. to 70° C., preferably about 35° C. to 45° C. The heating time may be normally about 24 hours to 120 hours, preferably about 48 hours to 72 hours. Next, the sealant layer 4 is laminated on a surface of the metal layer 3 on a side opposite to the base material layer 1 to obtain a packaging material for a cell. In the process for producing a packaging material for a cell according to the present invention, it is not necessary to carry out a long-time aging step that has been required heretofore, and therefore the lead time can be reduced. An aging step may be carried out in the process for producing a packaging material for a cell according to the present invention.

In the packaging material for a cell according to the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

5. Use of Packaging Material for Cell

The packaging material for a cell according to the present invention is used as a packaging material for hermetically sealing and storing cell elements such as a positive electrode, a negative electrode and an electrolyte.

Specifically, a cell element including at least a positive electrode, a negative electrode and an electrolyte is covered with the packaging material for a cell according to the present invention such that a flange portion (region where sealant layers are in contact with each other) can be formed on the peripheral edge of the cell element while a metal terminal connected to each of the positive electrode and the negative electrode protrudes to outside. Next, sealant layers at the flange portion are heat-sealed to each other to hermetically seal the cell element, thereby providing a cell sealed with the packaging material for a cell according to the present invention. When the cell element is stored using the packaging material for a cell according to the present invention, the packaging material for a cell according to the present invention is used such that the sealant layer 4 is on the inner side (surface in contact with the cell element).

The packaging material for a cell according to the present invention may be used for either a primary battery or a secondary battery, but is preferably used for a secondary battery. The type of secondary battery to which the packaging material for a cell according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the packaging material for a cell according to the present invention is applied include lithium ion batteries and lithium ion polymer batteries.

EXAMPLES

The present invention will be described in detail below by showing examples and comparative examples. It is to be noted that the present invention is not limited to examples.

Example 1

A urethane acrylate having two acryloyl groups (EBECRYL9227EA manufactured by Daicel-Cytec Co Ltd.; weight average molecular weight: 6000), an epoxy acrylate (EBECRYL3703 manufactured by Daicel-Cytec Co Ltd.) and a phosphoric acid acrylate (LIGHT ACRYLATE P-1A (N) manufactured by KYOEISHA CHEMICAL Co., LTD) were mixed at a mass ratio (solid content ratio) of 80:10:10 to obtain a resin composition.

Example 2

Except that an acryl-based silane coupling agent (KBM-5103 manufactured by Shin-Etsu Chemical Co., Ltd.) was used in place of the phosphoric acid acrylate, and the urethane acrylate, the epoxy acrylate and the acryl-based silane coupling agent were mixed at a mass ratio (solid content ratio) of 99.7:0.2:0.1, the same procedure as in Example 1 was carried out to obtain a resin composition.

Example 3

Except that an acrylate having an isocyanate group (Karenz AOI manufactured by Showa Denko K.K.; compound name: 2-isocyanatoethyl acrylate) was used in place of the phosphoric acid acrylate, and the urethane acrylate, the epoxy acrylate and the acrylate having an isocyanate group were mixed at a mass ratio (solid content ratio) of 90:5:5, the same procedure as in Example 1 was carried out to obtain a resin composition.

Example 4

Except that an acryl-based silane coupling agent (KBM-5103 manufactured by Shin-Etsu Chemical Co., Ltd.) was further added, and the urethane acrylate, the epoxy acrylate, the phosphoric acid acrylate and the acryl-based silane coupling agent were mixed at a mass ratio (solid content ratio) of 80:10:9:1, the same procedure as in Example 1 was carried out to obtain a resin composition.

Example 5

Except that an acrylate having an isocyanate group (Karenz AOI manufactured by Showa Denko K.K.; compound name: 2-isocyanatoethyl acrylate) was further added, and the urethane acrylate, the epoxy acrylate, the phosphoric acid acrylate and the acrylate having an isocyanate group were mixed at a mass ratio (solid content ratio) of 90:0.5:0.5:9, the same procedure as in Example 1 was carried out to obtain a resin composition.

Example 6

Except that an acryl-based silane coupling agent (KBM-5103 manufactured by Shin-Etsu Chemical Co., Ltd.) was used in place of the phosphoric acid acrylate, and the urethane acrylate, the epoxy acrylate, the acryl-based silane coupling agent and acrylate having an isocyanate group were mixed at a mass ratio (solid content ratio) of 99.5:0.2:0.1:0.2, the same procedure as in Example 5 was carried out to obtain a resin composition.

Example 7

Except that an acrylate having an isocyanate group (Karenz AOI manufactured by Showa Denko K.K.; compound name: 2-isocyanatoethyl acrylate) was further added, and the urethane acrylate, the epoxy acrylate, the phosphoric acid acrylate, the acryl-based silane coupling agent and the acrylate having an isocyanate group were mixed at a mass ratio (solid content ratio) of 80:19.5:0.2:0.1:0.2, the same procedure as in Example 4 was carried out to obtain a resin composition.

Comparative Example 1

Except that the epoxy acrylate and the phosphoric acid acrylate were not used, the same procedure as in Example 1 was carried out to obtain a resin composition.

Comparative Example 2

Except that the phosphoric acid acrylate was not used, and the urethane acrylate and the epoxy acrylate were mixed at a mass ratio (solid content ratio) of 90:10, the same procedure as in Example 1 was carried out to obtain a resin composition.

Comparative Example 3

Except that the epoxy acrylate was not used, and the urethane acrylate and the phosphoric acid acrylate were mixed at a mass ratio (solid content ratio) of 80:20, the same procedure as in Example 1 was carried out to obtain a resin composition.

Comparative Example 4

Except that the epoxy acrylate was not used, and the urethane acrylate and the acryl-based silane coupling agent were mixed at a mass ratio (solid content ratio) of 99.8:0.2, the same procedure as in Example 1 was carried out to obtain a resin composition.

Comparative Example 5

Except that the epoxy acrylate was not used, and the urethane acrylate and the acrylate having an isocyanate group were mixed at a mass ratio (solid content ratio) of 99.5:0.5, the same procedure as in Example 1 was carried out to obtain a resin composition.

Comparative Example 6

Except that the epoxy acrylate was not used, and the urethane acrylate, the phosphoric acid acrylate and the acryl-based silane coupling agent were mixed at a mass ratio (solid content ratio) of 80:10:10, the same procedure as in Example 4 was carried out to obtain a resin composition.

Comparative Example 7

Except that the epoxy acrylate was not used, and the urethane acrylate, the phosphoric acid acrylate and the acrylate having an isocyanate group were mixed at a mass ratio (solid content ratio) of 90:5:5, the same procedure as in Example 5 was carried out to obtain a resin composition.

Comparative Example 8

Except that the epoxy acrylate was not used, and the urethane acrylate, the acryl-based silane coupling agent and the acrylate having an isocyanate group were mixed at a mass ratio (solid content ratio) of 94.5:0.5:5, the same procedure as in Example 6 was carried out to obtain a resin composition.

Comparative Example 9

Except that the epoxy acrylate was not used, and the urethane acrylate, the phosphoric acid acrylate, the acryl-based silane coupling agent and the acrylate having an isocyanate group were mixed at a mass ratio (solid content ratio) of 90:0.5:0.5:9, the same procedure as in Example 7 was carried out to obtain a resin composition.

[Example of Production of Laminate]

As an aluminum foil for forming a metal layer, one obtained by subjecting to a chemical conversion treatment both the surfaces of an aluminum foil (thickness: 40 μm) composed of soft aluminum (JIS H4160 A8021H-O) was used. The chemical conversion treatment of the aluminum foil was performed by applying to both the surfaces of the metal layer a treatment liquid including a phenol resin, a chromium fluoride compound and phosphoric acid using a roll coating method, and performing baking for 20 seconds under such conditions that the film temperature was 180° C. or higher. Next, the resin composition obtained in each of Examples 1 to 7 and Comparative Examples 1 to 9 was applied in a thickness of 4 μm onto one of the surfaces of the aluminum foil subjected to the chemical conversion treatment. Next, a stretched nylon film for forming a base material layer was bonded onto the resin composition layer by a dry lamination method. The drying temperature in the dry lamination method was 60° C. Next, the resin composition was cured by applying an electron beam from above the stretched nylon film using an electron beam irradiation apparatus (accelerated voltage: 120 kV; irradiation dose: 50 kGy). Next, a sealant layer including two layers: a carboxylic acid-modified polypropylene-based resin layer (thickness: 23 μm) and a homopolypropylene resin layer (thickness: 23 μm) were laminated onto the metal layer, and the metal layer and the sealant layer were bonded to each other by coextrusion processing to obtain a laminate using the resin composition of each of Examples 1 to 7 and Comparative Examples 1 to 9. It is to be noted that the sealant layer was laminated with the acid-modified polypropylene-based resin layer situated on the metal layer side.

[Adhesion Evaluation Test]

The laminate obtained using the resin composition of each of Examples 1 to 7 and Comparative Examples 1 to 9 was cut in the form of a strip with a width of 15 mm to obtain a test piece. Next, the stretched nylon film and the aluminum foil of the obtained test piece were drawn at a speed of 50 mm/minute using a tensile tester (AGS-50D (trade name) manufactured by Shimadzu Corporation), so that the peeling strength (N/15 mm) of the laminate was measured. The results are shown in Table 1.

[Moisture and Heat Resistance Evaluation Test]

The laminate obtained using the resin composition of each of Examples 1 to 7 and Comparative Examples 1 to 9 was cut to a size of 80 mm×120 mm to obtain a test piece. Next, using a female mold with an opening size of 30 mm×50 mm and a male mold corresponding to the female mold, cold molding was performed so that a recess portion with a depth of 6.0 mm was formed in the obtained test piece. Next, the molded laminate was left standing for 48 hours under an environment at a temperature of 65° C. and a humidity of 90%, and evaluated for delamination between layers by visual observation. Samples in which delamination between layers of the laminate did not occur were rated good (○) for moisture and heat resistance, and samples in which delamination between layers of the laminate occurred were rated bad (x) for moisture and heat resistance. The results are shown in Table 1.

TABLE 1

| | Composition of resin composition | | | | Evaluation of adhesion (peeling strength N/15 mm) | Evaluation of moisture and heat resistance |
|---|---|---|---|---|---|---|
| | (1) | (3) | (2) | | | |
| Example 1 | Urethane acrylate 80 | Epoxy acrylate 10 | Phosphoric acid acrylate 10 | | 8.3 | ○ |
| Example 2 | Urethane acrylate 99.7 | Epoxy acrylate 0.2 | Acryl-based silane coupling agent 0.1 | | 7.2 | ○ |
| Example 3 | Urethane acrylate 90 | Epoxy acrylate 5 | Acrylate having isocyanate group 5 | | 8.8 | ○ |
| Example 4 | Urethane acrylate 80 | Epoxy acrylate 10 | Phosphoric acid acrylate 9 | Acryl-based silane coupling agent 1 | 9 | ○ |
| Example 5 | Urethane acrylate 90 | Epoxy acrylate 0.5 | Phosphoric acid acrylate 0.5 | Acrylate having isocyanate group 9 | 8.1 | ○ |
| Example 6 | Urethane acrylate 99.5 | Epoxy acrylate 0.2 | Acryl-based silane coupling agent 0.1 | Acrylate having isocyanate group 0.2 | 9.5 | ○ |

TABLE 1-continued

| | Composition of resin composition | | | | | Evaluation of adhesion (peeling strength N/15 mm) | Evaluation of moisture and heat resistance |
|---|---|---|---|---|---|---|---|
| | (1) | (3) | (2) | | | | |
| Example 7 | Urethane acrylate 80 | Epoxy acrylate 19.5 | Phosphoric acid acrylate 0.2 | Acryl-based silane coupling agent 0.1 | Acrylate having isocyanate group 0.2 | 10 | ○ |
| Comparative Example 1 | Urethane acrylate 100 | | | | | 0.5 | x |
| Comparative Example 2 | Urethane acrylate 90 | Epoxy acrylate 10 | | | | 2.2 | x |
| Comparative Example 3 | Urethane acrylate 80 | | Phosphoric acid acrylate 20 | | | 7.7 | x |
| Comparative Example 4 | Urethane acrylate 99.8 | | | Acryl-based silane coupling agent 0.2 | | 8.5 | x |
| Comparative Example 5 | Urethane acrylate 99.5 | | | | Acrylate having isocyanate group 0.5 | 3.5 | x |
| Comparative Example 6 | Urethane acrylate 80 | | Phosphoric acid acrylate 10 | Acryl-based silane coupling agent 10 | | 7.2 | x |
| Comparative Example 7 | Urethane acrylate 90 | | Phosphoric acid acrylate 5 | | Acrylate having isocyanate group 5 | 8.8 | x |
| Comparative Example 8 | Urethane acrylate 94.5 | | | Acryl-based silane coupling agent 0.5 | Acrylate having isocyanate group 5 | 7.6 | x |
| Comparative Example 9 | Urethane acrylate 90 | | Phosphoric acid acrylate 0.5 | Acryl-based silane coupling agent 0.5 | Acrylate having isocyanate group 9 | 7.9 | x |

As is evident from Table 1, a laminate using the resin composition of each of Examples 1 to 7 which includes (1) a urethane acrylate; (2) at least one selected from the group consisting of a phosphoric acid acrylate, an acryl-based silane coupling agent, and an acrylate having an isocyanate group; and (3) an epoxy acrylate has high adhesion and is excellent in moisture and heat resistance. On the other hand, it has been found that a laminate using the resin composition of each of Comparative Examples 1 to 9 which includes the compound of (1) but does not include both the compounds of (2) and (3) is poor in one of adhesion and heat resistance.

DESCRIPTION OF REFERENCE SIGNS

1: Base material layer
2: Adhesive layer
3: Metal Layer
4: Sealant layer
5: Adhesive layer

The invention claimed is:

1. A packaging material for a cell, the packaging material comprising a laminate in which at least a base material layer, an adhesive layer, a metal layer, and a sealant layer are laminated in this order,
wherein:
the metal layer is directly laminated on the adhesive layer, and
the adhesive layer is formed of a cured product of a resin composition comprising:
(1) a urethane (meth)acrylate;
(2) at least one compound selected from the group consisting of a (meth)acrylate having a phosphoric acid group, a (meth)acryl-based silane coupling agent, and a (meth)acrylate having an isocyanate group; and
(3) an epoxy (meth)acrylate,
wherein in the resin composition, the mass ratio of the (1) urethane (meth)acrylate to the total of the (2) at least one selected from the group consisting of a (meth)acrylate having a phosphoric acid group, a (meth)acryl-based silane coupling agent, and a (meth)acrylate having an isocyanate group and the (3) epoxy (meth)acrylate ((1):(2)+(3)) is in the range of 99.8:0.2 to 80:20.

2. The packaging material according to claim 1, wherein the resin composition is cured when heated or irradiated with an ionizing radiation.

3. The packaging material according to claim 1, wherein the at least one compound (2) comprises a (meth)acrylate having an isocyanate group.

4. The packaging material according to claim 1, wherein the at least one compound (2) comprises a (meth)acryl-based silane coupling agent and a (meth)acrylate having an isocyanate group.

5. The packaging material according to claim 1, wherein the at least one compound (2) comprises a (meth)acrylate having a phosphoric acid group, a (meth)acryl-based silane coupling agent, and a (meth)acrylate having an isocyanate group.

6. The packaging material according to claim 1, wherein the resin composition comprises, with respect to 100 parts by weight of the resin composition:
80 to 99.7 parts by weight of a urethane acrylate;
0 to 10 parts by weight a phosphoric acid acrylate;
0 to 1 parts by weight of an acryl-based silane coupling agent;

0 to 9 parts by weight of an acrylate having an isocyanate group; and 0.2 to 19.5 parts by weight of an epoxy acrylate.

7. The packaging material according to claim 1, wherein at least one surface of the metal layer has been subjected to a chemical conversion treatment.

8. A method for producing a packaging material for a cell, the method comprising a step of laminating at least a base material layer, an adhesive layer, a metal layer and a sealant layer in this order to obtain a laminate, wherein:
   the metal layer is directly laminated on the adhesive layer, and
   the adhesive layer is formed by curing a resin composition containing:
   (1) a urethane (meth)acrylate;
   (2) at least one compound selected from the group consisting of a (meth)acrylate having a phosphoric acid group, a (meth)acryl-based silane coupling agent, and a (meth)acrylate having an isocyanate group; and
   (3) an epoxy (meth)acrylate,
   wherein in the resin composition, the mass ratio of the (1) urethane (meth)acrylate to the total of the (2) at least one selected from the group consisting of a (meth)acrylate having a phosphoric acid group, a (meth)acryl-based silane coupling agent, and a (meth)acrylate having an isocyanate group and the (3) epoxy (meth)acrylate ((1):(2)+(3)) is in the range of 99.8:0.2 to 80:20.

9. The method according to claim 8, wherein at least one surface of the metal layer has been subjected to a chemical conversion treatment.

10. A packaging material for a cell, the packaging material comprising a laminate in which at least a base material layer, an adhesive layer, a metal layer, and a sealant layer are laminated in this order,
   wherein the adhesive layer is formed of a cured product of a resin composition comprising:
   (1) a urethane (meth)acrylate;
   (2) a (meth)acrylate having a phosphoric acid group, a (meth)acryl-based silane coupling agent, and a (meth)acrylate having an isocyanate group; and
   (3) an epoxy (meth)acrylate,
   wherein in the resin composition, the mass ratio of the (1) urethane (meth)acrylate to the total of the (2) at least one selected from the group consisting of a (meth)acrylate having a phosphoric acid group, a (meth)acryl-based silane coupling agent, and a (meth)acrylate having an isocyanate group and the (3) epoxy (meth)acrylate ((1):(2)+(3)) is in the range of 99.8:0.2 to 80:20.

\* \* \* \* \*